US012644737B2

(12) United States Patent
Aitbraham et al.

(10) Patent No.: US 12,644,737 B2
(45) Date of Patent: Jun. 2, 2026

(54) ELECTROMAGNETIC FLOWMETER WITH PRIMARY AND SECONDARY PAIRS OF COILS

(71) Applicant: Siemens Aktiengesellschaft, Munich (DE)

(72) Inventors: Pascal Aitbraham, Haguenau (FR); Qin Qin Fu, Dalian (CN); Frederic May, Eberbach-Seltz (FR)

(73) Assignee: Siemens Aktiengesellschaft, Munich (DE)

( * ) Notice: Subject to any disclaimer, the term of this patent is extended or adjusted under 35 U.S.C. 154(b) by 231 days.

(21) Appl. No.: 18/286,678

(22) PCT Filed: Apr. 8, 2022

(86) PCT No.: PCT/EP2022/059416
§ 371 (c)(1),
(2) Date: Oct. 12, 2023

(87) PCT Pub. No.: WO2022/218852
PCT Pub. Date: Oct. 20, 2022

(65) Prior Publication Data
US 2024/0200994 A1 Jun. 20, 2024

(30) Foreign Application Priority Data

Apr. 15, 2021 (EP) .................................... 21168578

(51) Int. Cl.
G01F 1/58 (2006.01)
(52) U.S. Cl.
CPC .................................... G01F 1/586 (2013.01)
(58) Field of Classification Search
CPC ....................................................... G01F 1/586
(Continued)

(56) References Cited

U.S. PATENT DOCUMENTS 3,490,282 A 1/1970 Wada
4,503,711 A 3/1985 Bohn
(Continued)

FOREIGN PATENT DOCUMENTS

CN 112146715 12/2020
DE 1911556 9/1970
(Continued)

OTHER PUBLICATIONS

PCT International Search Report dated Jul. 1, 2022 based on PCT/EP2022/059416 filed Apr. 8, 2022.

*Primary Examiner* — Peter J Macchiarolo
*Assistant Examiner* — John M Royston
(74) *Attorney, Agent, or Firm* — Cozen O'Connor

(57) ABSTRACT

An electromagnetic flowmeter includes at least one primary pair of coils, at least one secondary pair of coils and a transmitter, wherein the at least one primary pair of coils generates at least one magnetic field within a measuring section for measuring the volumetric flow of fluid, where the at least one secondary pair of coils can be excited independently in relation to the at least one primary pair of coils, where the transmitter is configured to excite the secondary pairs of coils to generate at least one secondary magnetic field upon detection of a predefined event, where the generated at least one secondary magnetic field interacts with at least one magnetic field from the at least one magnetic field generated by the primary pairs of coils to improve at least one of a magnetic field homogeneity or magnetic field strength in a measuring of the flowmeter.

9 Claims, 5 Drawing Sheets

(58) Field of Classification Search
USPC ...................................................... 73/861.11
See application file for complete search history.

(56)                    References Cited

U.S. PATENT DOCUMENTS

| | | | |
|---|---|---|---|
| 2014/0083199 A1* | 3/2014 | Rogers | G01F 1/588 |
| | | | 73/861.12 |
| 2024/0175732 A1 | 5/2024 | Aitbraham et al. | |

FOREIGN PATENT DOCUMENTS

| | | |
|---|---|---|
| DE | 102014113404 | 3/2016 |
| EP | 0233084 | 8/1987 |
| EP | 3184969 | 6/2017 |
| EP | 4271968 B1 | 6/2025 |
| JP | H0510796 | 1/1993 |
| RU | 2343423 | 1/2009 |
| WO | 9315379 | 8/1993 |
| WO | 9852001 | 11/1998 |
| WO | 2014028450 | 2/2014 |
| WO | 2016050787 | 4/2016 |

* cited by examiner

Figure 4:
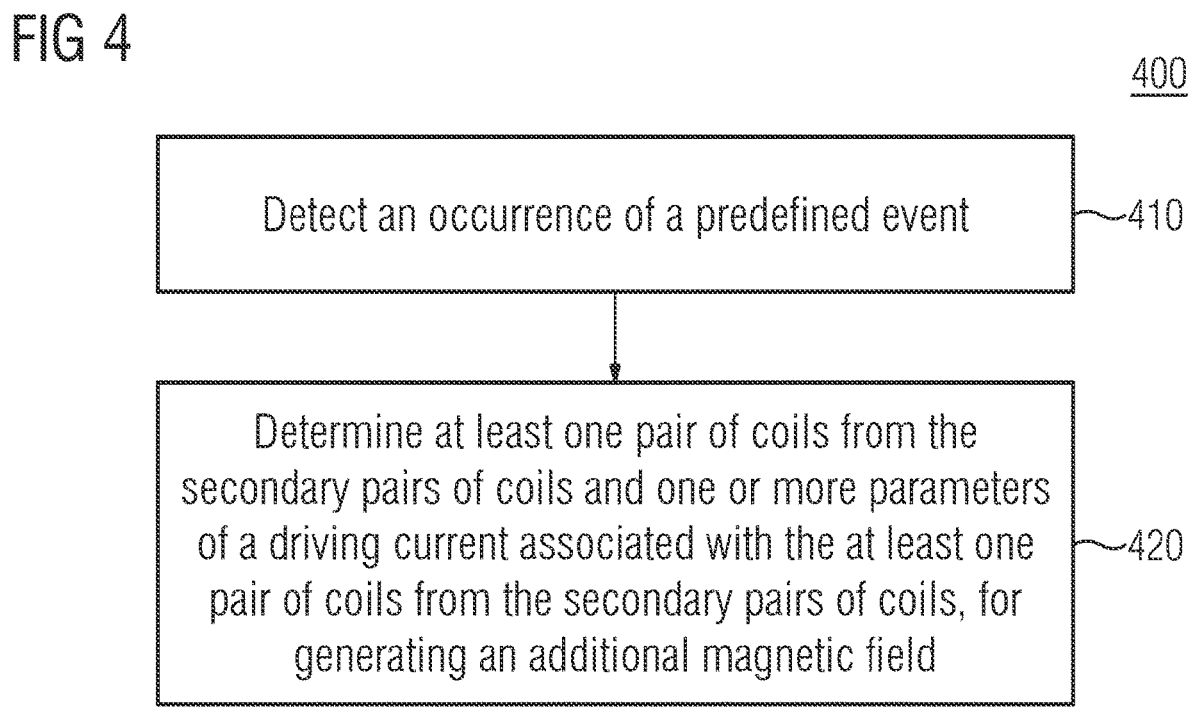

Detect an occurrence of a predefined event     ~410

Determine at least one pair of coils from the secondary pairs of coils and one or more parameters of a driving current associated with the at least one pair of coils from the secondary pairs of coils, for generating an additional magnetic field     ~420

ELECTROMAGNETIC FLOWMETER WITH PRIMARY AND SECONDARY PAIRS OF COILS

CROSS-REFERENCE TO RELATED APPLICATIONS

This is a U.S. national stage of application No. PCT/EP2022/059416 filed 8 Apr. 2022. Priority is claimed on European Application No. 21168578.9 filed 15 Apr. 2021, the content of which is incorporated herein by reference in its entirety.

BACKGROUND OF THE INVENTION

1. Field of the Invention

The current disclosure relates to flowmeters and, more particularly, to electromagnetic flowmeters utilized to measure flow of in large pipes in industrial fluids automation. Electromagnetic flowmeters (also referred to as magnetic-inductive flowmeters) measure the velocity and volume of fluid on the basis of electrodynamic induction, where a magnetic field is generated perpendicular to the flow direction and, accordingly, due to the interaction between the magnetic field and the conductive fluid flowing, a voltage perpendicular to the magnetic field and to the flow direction is generated s then measured via electrodes such that the velocity and volume of the fluid flowing is accordingly determined based on the magnitude of the voltage generated.

2. Description of the Related Art

The current disclosure relates to electromagnetic flowmeters. As mentioned previously, electromagnetic flowmeters measure volumetric flow of fluid by applying a magnetic field perpendicular to the flow of the fluid. Accordingly, to generate the magnetic field, the electromagnetic flowmeter includes a plurality of electromagnetic coils which, when excited (by applying a current to them), generate the magnetic field. Electromagnetic flowmeters can be used along with pipes of various sizes including large diameter pipes. For large diameter electromagnetic flowmeters, coils have to be of special construction, to ensure the generated magnetic field is spread across the diameter of a measuring section of the electromagnetic flowmeter.

Often such flowmeters utilize a pair of diamond shaped or rhombus shaped of coils, where each coil covers half of the circumference of a measuring section. Through the rhombus shape, the resultant magnetic field is distributed across the cross section of the flowmeter. However, this requires large coils which are difficult to construct and often involve substantial costs. Additionally, special care has to be during the construction of the flowmeter to ensure that the large coils are installed properly. Accordingly, there is a need for an electromagnetic flowmeter which addresses the issues mentioned above.

SUMMARY OF THE INVENTION

In view of the foregoing, it is accordingly an object of the present invention to provide an electromagnetic flowmeter that can be installed on a fluid carrying channel for measuring a volumetric flow of a fluid flowing within the fluid carrying channel.

These and other objects and advantages are achieved in accordance with the invention by an electromagnetic flowmeter comprising a measuring section configured to permit a flow of the fluid through the electromagnetic flowmeter, and a plurality of pairs of coils installed on the circumference of the measuring section. The plurality of pair of coils comprises at least one primary pair of coils and at least one secondary pair of coils. The at least one primary pair of coils generates at least one magnetic field within the measuring section to measure the volumetric flow of fluid. The at least one secondary pair of coils are capable of being independently excited in relation the at least one primary pair of coils.

The electromagnetic flowmeter additionally comprises a transmitter for exciting the plurality of pairs of coils by providing at least one driving current. The transmitter is configured to excite the secondary pairs of coils upon detection of a predefined event. In an exemplary embodiment, upon excitation, the at least one secondary pair of coils generates at least one secondary magnetic field. The generated at least one secondary magnetic field interacts with at least one magnetic field from the at least one magnetic field generated by the at least one primary pair of coils to improve either the magnetic field homogeneity of the at least one magnetic field and/or the magnetic gain of the at least one magnetic field.

Accordingly, the current disclosure describes an electromagnetic flowmeter having a plurality of coils that are used to generate a plurality of magnetic fields within the measuring section of the electromagnetic flowmeter. Through the use of the plurality of coils, the electromagnetic flowmeter can ensure that resultant magnetic fields are spread evenly across the cross section of the measuring section of the electromagnetic flowmeter.

Additionally, each coil from the pair of coils is required to generate a magnetic field covering only a part of the cross section of the measuring section. Consequently, the size of the coil is relatively small and therefore the construction effort and the cost of the electromagnetic flowmeter is relatively low. Moreover, through the use of the secondary pairs of coils, the electromagnetic flowmeter can better regulate the magnetic fields generated by the primary pairs of coils. Accordingly, via the interaction between the magnetic fields generated by the secondary fields and the magnetic fields by the primary fields, even distribution of the magnetic fields is ensured in the cross section of the measuring section of the electromagnetic flowmeter.

In another exemplary embodiment, the at least one secondary coil can measure the at least one magnetic field generated by the at least one primary coil. The at least one secondary coils can form an electromagnetic circuit with the at least one primary coil and accordingly, due to the magnetic fields generated by the primary coils, a voltage may be generated in the at least one secondary pair of coils. As such, based on the magnitude of voltage generated across the secondary pairs of coils, the strength of the magnetic fields generated by the one or more primary coils can be measured. Consequently, this allows for measurement of magnetic fields generated by primary pairs of coils, without additional elements.

Additionally, through the use of the secondary pairs of coils, measurement inaccuracies due to gradual degradation or due to improper installation/assembly of the electromagnetic flowmeter, may be addressed. The secondary pairs of coils can measure the magnetic fields generated by the primary pairs of coils, and when an issue with the magnetic fields (such as degradation) the secondary pairs of coils can generate additional magnetic fields to compensate for the issue. Accordingly, this reduces the number of calibration and maintenance required for the electromagnetic flowmeter.

In an exemplary embodiment, the predefined event is associated with a measurement parameter of the electromagnetic flowmeter, where the measurement parameter is indicative of a measurement effectiveness of the electromagnetic flowmeter. For example, the measurement parameter is associated with flow profile. In another exemplary embodiment, the measurement parameter is indicative of the strength of the magnetic field within the measuring section. In a further exemplary embodiment, the predefined event is a periodic event with a frequency set during one of the calibration of the electromagnetic flowmeter and installation of the electromagnetic flowmeter. Accordingly, the secondary pairs of coils may be switched on regularly to enable the electromagnetic flowmeter to take measurements at higher magnetic field strength to ensure better measurement accuracy.

In yet another exemplary embodiment, the predefined event is associated with a condition of a process equipment. The electromagnetic flowmeter is installed on a fluid carrying channel for measuring the volumetric flow of a fluid flowing within the fluid carrying channel, and the fluid carrying channel is connected to at least one of an input and output valves of the process equipment. Accordingly, the secondary pair of coils are activated only when required based on the condition of the process equipment. Accordingly, the activation of the secondary pairs of coils can be configured based on the application where the electromagnetic flowmeter is deployed.

In an embodiment, a diameter of the measuring section is within a range of 1200 millimeters to 3200 millimeters. Accordingly, the electromagnetic flowmeter is for use with pipes of large diameter. In another embodiment, the magnetic field strength at the center of the measuring section is between 0.01 milli Tesla and 10 milli Tesla. In a further embodiment, in which the at least one primary pair of coils and the at least one secondary pair of coils are installed along a first plane of the measuring section, the first plane perpendicular to the flow of the fluid in the measuring section. Accordingly, the magnetic fields generated by the plurality of pairs of coils are all generated along the same plane.

The objects and advantages are also achieved in accordance with the invention by a method of operating an electromagnetic flowmeter for measuring a volumetric flow of a fluid. The electromagnetic flowmeter comprises a plurality of pairs of coils installed on a circumference of a measuring section of the electromagnetic flowmeter. The plurality of pair of coils includes at least one primary pair of coils for generating at least one magnetic field within the measuring section to measure the volumetric flow of fluid and at least one secondary pair of coils capable of being independently excited in relation to the at least one primary pair of coils. The method comprises detecting an occurrence of a predefined event associated with either process equipment, the at least one magnetic field generated by the primary pairs of coils and/or a predefined frequency set during either the calibration of the electromagnetic flowmeter and/or installation of the electromagnetic flowmeter. The method additionally comprises determining at least one pair of coils from the secondary pairs of coils and at least one parameter of a driving current associated with the at least one pair of coils from the secondary pairs of coils to generate a secondary magnetic field. The secondary magnetic field can interact with at least one magnetic field from the at least one magnetic field generated by the primary coils to improve either the magnetic field homogeneity of the at least one magnetic field and/or the magnetic gain of the at least one magnetic field. The advantages of the device apply to the method described herein.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The following detailed description references the drawings, in which:

FIG. 4 is a flowchart of a method for measuring a volumetric flow fluid carrying channel for measuring a volumetric flow of a fluid flowing within the fluid carrying channel using an electromagnetic flowmeter in accordance with the invention;

DETAILED DESCRIPTION OF THE EXEMPLARY EMBODIMENTS

Figure 1:
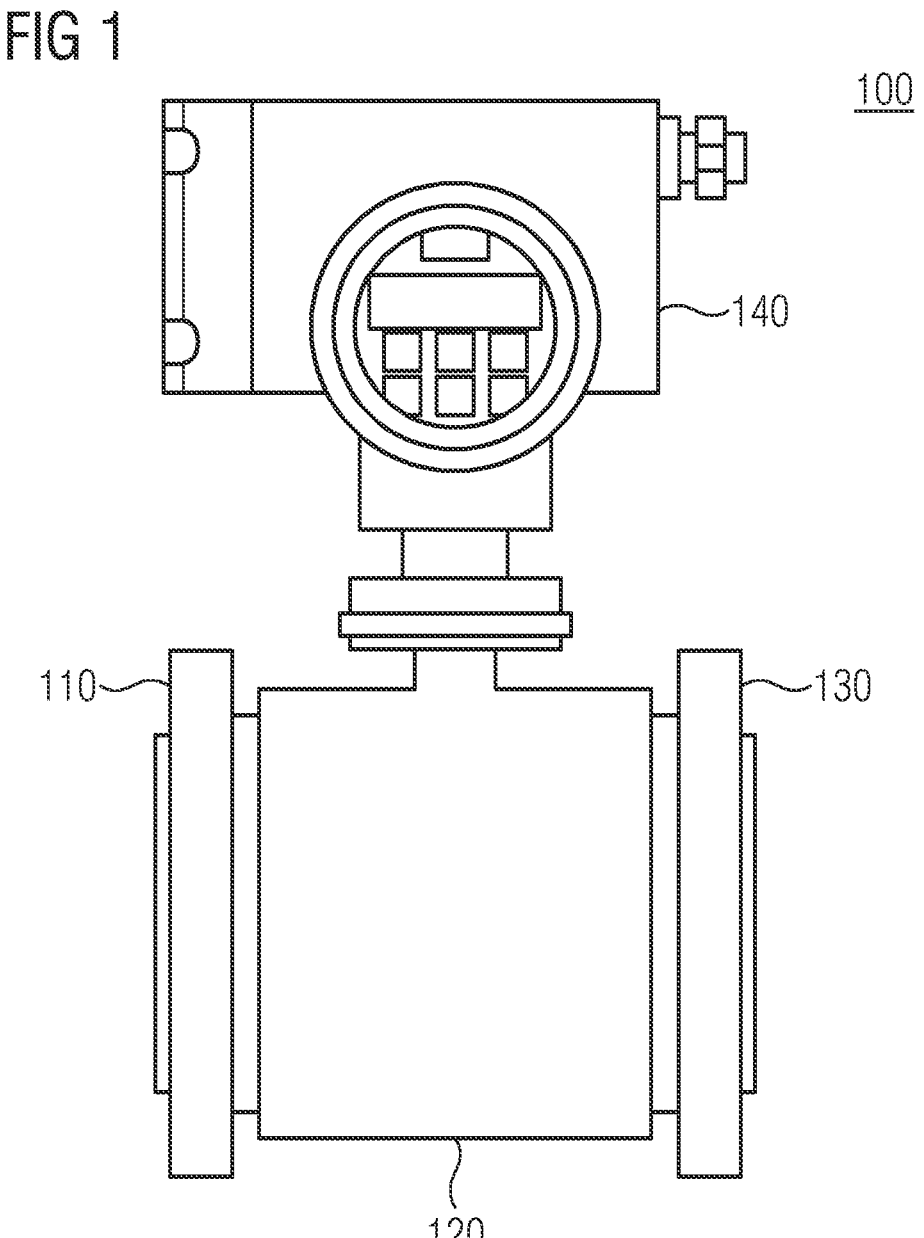
FIG. 1 shows an exemplary electromagnetic flowmeter with a transmitter in accordance with the invention.

FIG. 1 illustrates an exemplary electromagnetic flowmeter 100 in accordance to the present disclosure. The electromagnetic flowmeter 100 is installed on a pipe (also referred to as fluid carrying channel) in an industrial facility for measuring volumetric flow of a conducting fluid through the pipe. The electromagnetic flowmeter comprises flanges 110 and 130 for connecting to the flowmeter 100 to the of ends two pipes in the industrial facility. Additionally, the electromagnetic flowmeter 100 includes a measuring section 120 that forms the main channel of the electromagnetic flowmeter 100 through which the conducting fluid flows. Further, the electromagnetic flowmeter 100 includes a transmitter and an human machine interface (HMI) module 140. The transmitter and HMI module 140 allows for display of values associated with the electromagnetic flowmeter 100 and configuration of the electromagnetic flowmeter 100. Additionally, the transmitter and HMI module 140 can excite a plurality of coils (also known as electromagnetic coils) to measure the volumetric flow of the fluid through the flowmeter.

Figure 2:
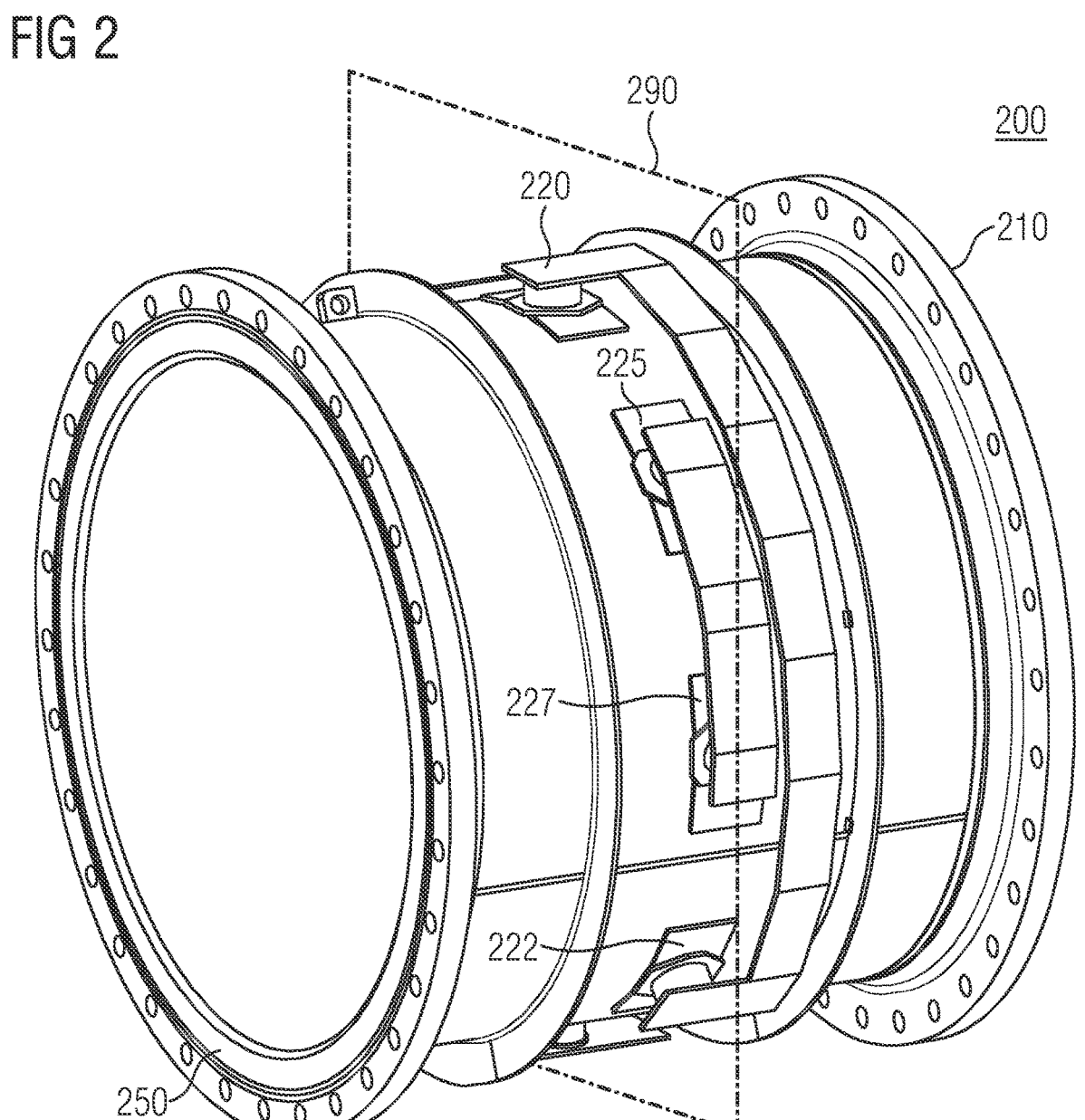
FIG. 2 is a perspective view of a measuring section with a plurality of pairs of coils of the exemplary electromagnetic flowmeter of FIG. 1.

The measuring section and the coils are further illustrated in FIG. 2 and explained in the description associated with FIG. 2, which shows a perspective internal view of an exemplary measuring section 210. The measuring section 210 includes an insulating liner within the inner diameter of the measuring section to insulate the fluid from the rest of the measuring section 210. A plurality of pairs of electromagnetic coils (shown as coils 220, 225, 227, and 222) are installed on the outer diameter of the measuring section 210. The plurality of pairs of coils are installed along a first plane 290 of the measuring section 210, where the first plane 290 is perpendicular to the flow of the fluid in the measuring section 210. In an exemplary embodiment, the diameter of the measuring section (310) is within a range of 1200 millimeters to 3200 millimeters.

The plurality of pairs of electromagnetic coils (also referred to as coils) includes at least one primary pair of coils and at least one secondary pairs of coils. As mentioned previously, the transmitter 140 can excite the plurality of pairs of coils by providing at least one driving current. The at least one primary pair of coils, upon excitation, generate at least one magnetic field within the measuring section to measure the volumetric flow of fluid. The magnetic field strength at the center of the measuring section 310 is between 0.01 milli Tesla and 10 milli Tesla.

The interaction of the magnetic fields and the conducting fluid flowing through the measuring section 210 generates a voltage that is then measured by at least one measuring electrode. The generated voltage is proportional to the magnetic field and the velocity of the fluid and, accordingly, based on the generated voltage, the velocity of the fluid can be determined. Relative to diamond coils as known in the state of the art, the relative size of each coil from each pair of coils is small and, accordingly, each coil does not produce a magnetic field that covers the entire cross-section of the measuring section 210. However, this issue is addressed by having a plurality of pairs of coils that generate a plurality of magnetic fields. Accordingly, the plurality of magnetic fields cover the majority of the cross section of the measuring section 210. Therefore, through the use of the small coils (where each magnetic field generated by a corresponding pair of coils covers only a part of measuring section), the ease of construction of the electromagnetic flowmeter is improved and the overall cost of the electromagnetic flowmeter.

The at least one secondary pair of coils can be excited independently in relation to the at least one primary pair of coils and, accordingly, during normal operation, the at least one secondary pair of coils is not excited. The secondary pairs of coils are excited upon the detection of a predefined event, in order to improve magnetic field within the measuring section 210. This is further explained in relation to FIG. 3.

Figure 3:
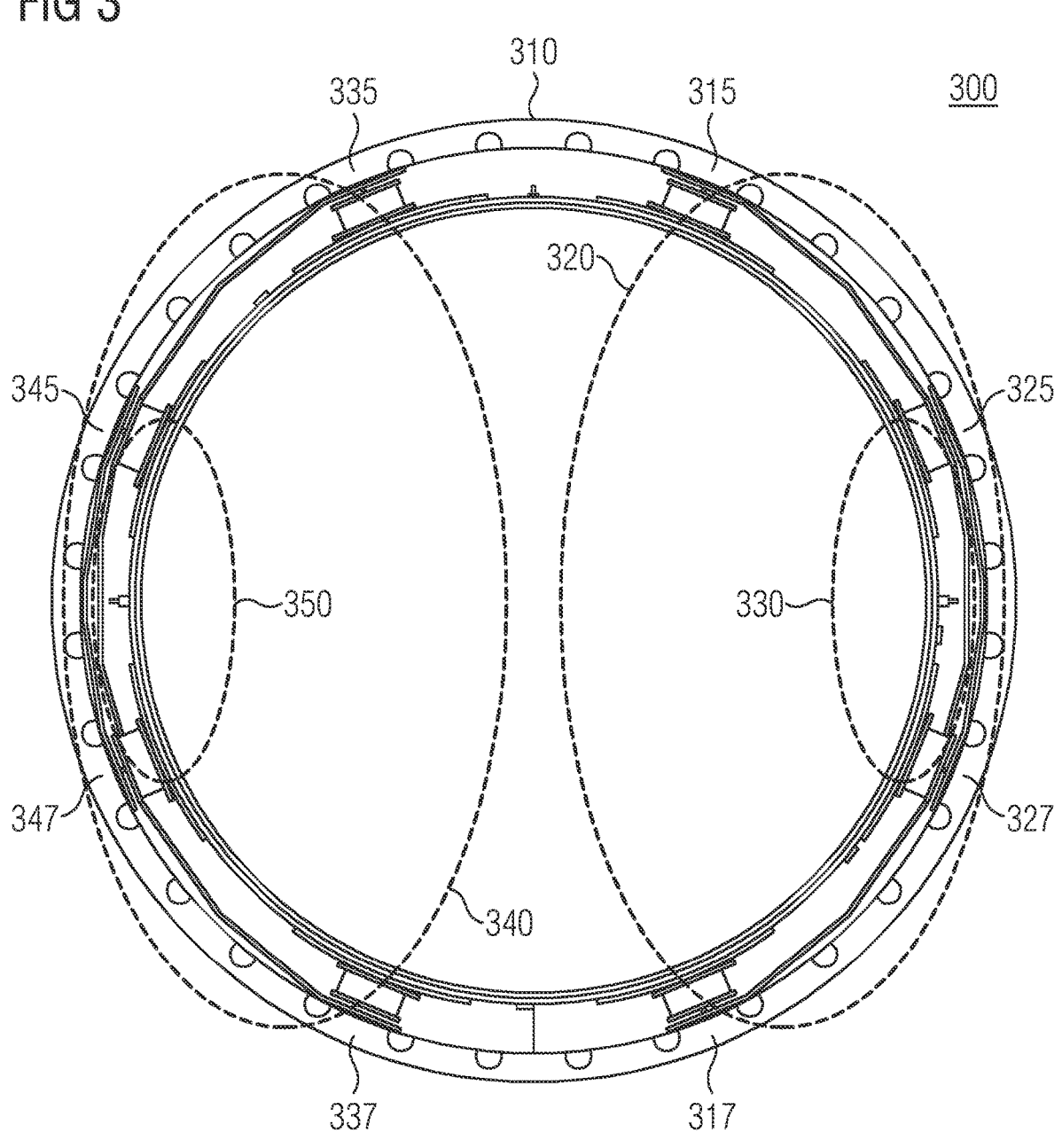
FIG. 3 is front cross-sectional view of the exemplary electromagnetic flowmeter of FIG. 1 illustrating the plurality of pairs of coils mounted on the measuring section and the plurality of magnetic fields generated by the plurality of pairs of coils.

FIG. 3 shows front cross-sectional view of an exemplary measuring section 310 with a plurality of pairs of coils (shown as coils 325 and 327, 315 and 317, 335 and 337, 345 and 347). As mentioned previously, the plurality of pairs of coils (325 and 327, 315 and 317, 335 and 337, 345 and 347) are mounted on the measuring section 310. While in the Figure, four pairs of coils (325 and 327, 315 and 317, 335 and 337, 345 and 347) are shown, there may be other combinations involving at least two pairs of coils. As mentioned previously, the plurality of pairs of coils includes at least one primary pair of coils (315 and 317, 335 and 337) and at least one secondary pair of coils (325 and 327, 345 and 347). For example, the primary pairs of coils include coils 335 and 337, and coils 315 and 317. Each pair of coils from the primary pairs of coils generates a corresponding magnetic field upon being excited by a driving current from a transmitter (not shown here). For example, as shown in FIG. 3, the primary pair of coils 315 and 317 when excited, generate the magnetic field 320. Similarly, the pairs of coils 335 and 337 when excited, generate the magnetic field 340. As mentioned above, during normal operation, only the primary pair of coils are active and, accordingly, only the magnetic fields (320 and 340) are generated within the measuring section 310. Consequently, measurement is performed using the magnetic fields (320 and 340) generated by the primary pairs of coils (325 and 327, 345 and 347). Additionally, during the normal operation, the secondary pairs of coils are not excited as such. The transmitter 140, during the normal operation, provides the driving current (or driving currents) to the primary pairs of coils to generate the magnetic fields (320 and 340). Furthermore, the transmitter 140 is configured to detect a predefined event (or a plurality of predefined events). The predefined event(s) is indicative of a need to improve the magnetic fields within the measuring section 310. As a result, based on the occurrence of the predefined event(s), the transmitter 140 is configured to excite at least one secondary pair of coils, which then generate at least one additional magnetic field (also referred to as secondary magnetic fields), shown in the FIG. 3 as secondary magnetic fields 330 and 350.

In an exemplary embodiment, the at least one secondary pair of coils (325 and 327, 345 and 347) can measure the at least one magnetic field (320 and 340) generated by the at least one primary pair of coils (315 and 317, 335 and 337), when not excited. The at least one secondary pair of coils (325 and 327, 345 and 347) can form an electromagnetic circuit with the at least one primary pair of coils (315 and 317, 335 and 337) and, accordingly, due to the magnetic fields (320, 340) generated by the primary pairs of coils (315 and 317, 335 and 337), a voltage may be generated in the at least one secondary pair of coils (325 and 327, 345 and 347). As a result, based on the magnitude of voltage generated across the secondary pairs of coils (325 and 327, 345 and 347), the strength of the magnetic fields generated by the one or more primary coils (315 and 317, 335 and 337) can be measured.

The at least one secondary magnetic fields (330, 350) can interact with at least one magnetic field (320, 340) from the one or more magnetic fields (320, 340) generated by the at least one primary pair of coils (315 and 317, 335 and 337) to improve either a magnetic field homogeneity of the one or more magnetic fields (320, 340) and/or a magnetic gain of the at least one magnetic field (320, 340). For example, when the magnetic homogeneity is not even within the measuring section 310 and is biased on the right side of the electromagnetic flowmeter, then the secondary pairs of coils (325 and 327, and 345 and 347) can generate additional magnetic fields (330 and 350) to tune the existing magnetic fields (320 and 340) so as to eliminate the bias and improve magnetic homogeneity. Accordingly, the magnetic fields within the measuring section 310 are improved and this enables better measurement accuracy. Further examples in relation to the predefined event are provided below.

Figure 5:
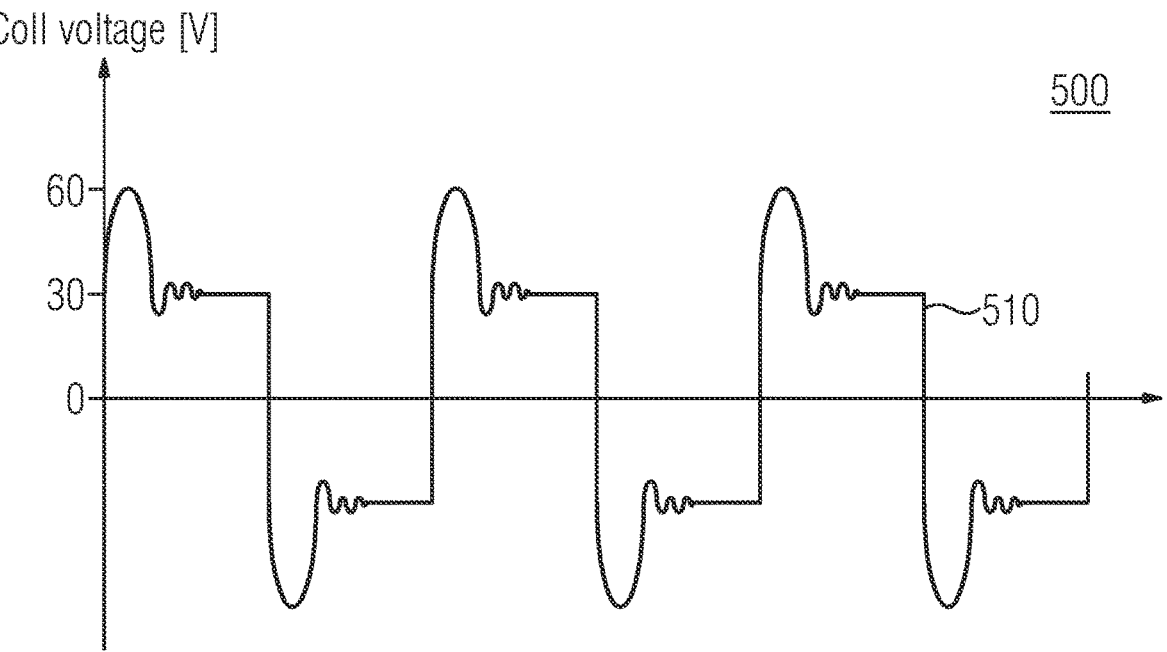
FIG. 5 illustrates a graphical plot of a waveform of an excitation voltage applied across the one or more primary pairs of coils over a period of time.
Figure 6:
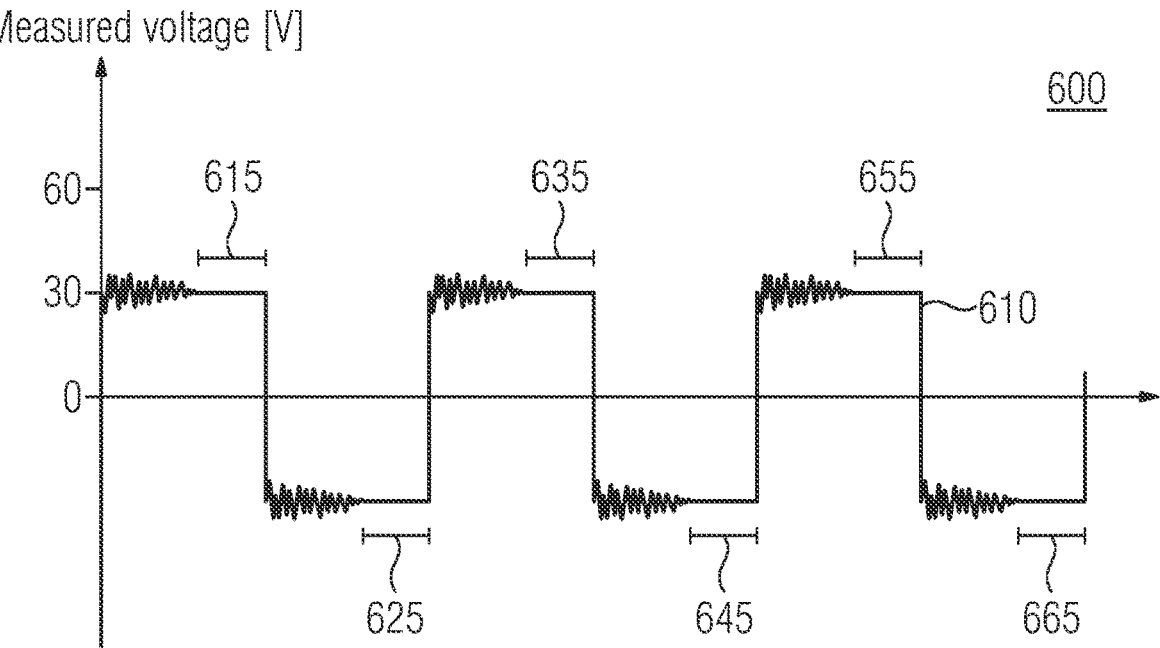
FIG. 6 illustrates a graphical plot of a waveform of a voltage measured across the measurement electrodes over a period of time.

In one example, the predefined event is associated with a measurement parameter of the electromagnetic flowmeter, where the measurement parameter is indicative of a measurement effectiveness of the electromagnetic flowmeter (100), as explained in relation to FIGS. 5 and 6.

FIG. 5 illustrates a graphical plot of the excitation voltage applied across the primary pairs of coils, over a period of time. The magnitude of the voltage is shown along the vertical axis (i.e., Y-axis) and time is shown along the horizontal axis (i.e., X-axis). As shown in the FIG. 5, the excitation voltage (also referred to as coil voltage) is a pulsed DC voltage provided by the transmitter 140 to excite the primary pairs of coils. Accordingly, based on the excitation of the primary pairs of coils and the movement of the conducting fluid within the measuring section 310, a voltage (also referred to measured voltage) is generated across the measurement electrodes (not shown in the Figures). The measured voltage is proportional to the magnetic field and the flow velocity and, similarly to the excitation voltage, has alternating cycles and resembles the excitation voltage waveform 510. This is shown in FIG. 6, where the measured voltage is shown as waveform 610 (which is similar to the waveform 510). The magnitude of the measured voltage is measured after the waveform has stabilized. Additionally, the magnitude is measured in both positive and negative phases of a cycle. For example, as shown in the FIG. 6, the magnitudes are measured during time periods 615 and 625, 635 and 645, 655 and 665. During normal operation, after stabilization and removal of parameters, such as noise, the magnitude of the measured voltage during the positive phase (referred to as Uee+) and negative phase (Uee−), is the same. Accordingly, the transmitter 140 checks the values of the measured voltage, during both phases of the measurement. However, when the values of the measured voltage don't match (i.e. the magnitude Uee+ is not equal to the magnitude of Uee−), the transmitter detects a potential abnormality. Sometimes, this may occur due to assembling or installing issues, dirt/wear of the coils, etc., while the flow velocity is constant. This may lead to accuracy problems. Accordingly, the predefined event is when the values of the measured voltage don't match (i.e. the magnitude Uee+ is not equal to the magnitude of Uee−).

When the transmitter 140 detects the above mentioned event, the transmitter utilizes the secondary pairs of coils (347 and 347, 325 and 327) to check the magnetic fields (320 and 340) generated by the primary pair of coils (315 and 317, 335 and 337) to evaluate whether the deviation in the magnitudes of voltages (Uee+ and Uee−) emanates from an issue with the electromagnetic flowmeter or from a change in the flow profile of the fluid. If the magnetic fields (320 and 340) are inequal, then the transmitter determines that the issue originates due to improper installation or due to degradation of the coils. Accordingly, to address this problem, the transmitter excites the secondary pairs of coils and/or adapts the driving current of the primary pairs of coils to adjust the magnetic fields and stabilize the measured voltage signal. For example, by exciting the secondary pairs of coils, secondary magnetic fields (330, 350) are generated. The secondary magnetic fields can interact with at least one magnetic field (320, 340) from the at least one magnetic fields (320, 340) generated by the at least one primary pair of coils (315 and 317, 335 and 337) to improve either magnetic field homogeneity of the at least one magnetic fields (320, 340) and/or a magnetic gain of the at least one magnetic field (320, 340).

In an exemplary embodiment, the predefined event is a periodic event with a frequency set during either the calibration of the electromagnetic flowmeter or installation of the electromagnetic flowmeter. For example, the electromagnetic flowmeter is power by a local power source (such as batteries) and, accordingly, in order to conserve power, the secondary pairs of coils are inactive usually and only excited at certain intervals to ensure that the measurements performed using the magnetic fields generated by the primary pairs of coils are accurate. For example, once every hour, the secondary pair of coils are excited, and the measurements made with during this instance are compared with the measurements made when the secondary pairs of coils are unexcited. For example, this is referred to as 'High accuracy' mode, the overall magnetic field homogeneity and magnetic field strength is increased substantially and this allows for precise measurement If the measurements are equivalent or if no measurement issues (such as difference in Uee+ and Uee−) are detected, then the secondary pairs of coils are no longer excited and only the primary pair of coils remain excited, which is referred to as 'stand-by and control' mode.

In another exemplary embodiment, the electromagnetic flowmeter is installed on a fluid carrying channel for measuring the volumetric flow of a fluid flowing within the fluid carrying channel and the predefined event is associated with a condition of a process equipment. The fluid carrying channel is connected to either an input and/or output valves of the process equipment. Accordingly, the secondary pairs of coils are excited based on the condition of the process equipment. For example, the process equipment is a pump, and the secondary pairs of coils are excited only when the pump is at a certain load threshold.

Accordingly, through use of the secondary pairs of coils, the electromagnetic flowmeter is able to fine tune the magnetic fields generated by the primary pairs of coils and thereby enables improved accuracy. Additionally, through the dynamic activation of the secondary pairs of coils, the electromagnetic flowmeter is more resilient to perturbations in flow profile of the fluid. Additionally, through the measurements of the magnetic fields generated by the primary pairs of coils using the secondary pairs of coils and through dynamic excitation of the secondary pairs of coils, the electromagnetic flowmeter can adapt to the installation and operating conditions of the industrial facility. Additionally, this reduces the need for additional calibration. Accordingly, the current disclosure discloses an electromagnetic flowmeter that can adapt the magnetic field within the measuring section of the electromagnetic flowmeter, and this improves the accuracy of the electromagnetic flowmeter because this enables the flowmeter to adapt to the conditions of the industrial facility. For example, this allows the flowmeter to be used in proximity to turns in the pipes and accordingly, the flowmeter does not need long inlet/outlet pipes (which is usually required for conventional flowmeters).

In another aspect, the current disclosure describes a method 400 of operating an electromagnetic flowmeter for measuring a volumetric flow of a fluid. As mentioned previously, the electromagnetic flowmeter comprises a plurality of pairs of coils (315 and 317, 335 and 337, 325 and 327, 345 and 347) installed on the circumference of a measuring section 310 of the electromagnetic flowmeter 100. The plurality of pair of coils (315 and 317, 335 and 337, 325 and 327, 345 and 347) includes at least one primary pair of coils (315 and 317, 335 and 337) for generating at least one magnetic field (320, 340) within the measuring section 310 to measure the volumetric flow of fluid and at least one secondary pair of coils (325 and 327, 345 and 347) that can be independently excited in relation to the at least one primary pair of coils (315 and 317, 335 and 337). The method 400 is performed by the electromagnetic flowmeter. The method 400 comprises detecting (410) an occurrence of a predefined event, where the predefined event is associated with either of process equipment, the at least one magnetic field (320, 340) generated by the at least one primary pair of coils (315 and 317, 335 and 337), or a predefined frequency set during either the calibration of the electromagnetic flowmeter (100) or installation of the electromagnetic flowmeter (100). The method further comprises determining (420) at least one secondary pair of coils (325 and 327, 345 and 347) from the secondary pairs of coils (325 and 327, 345 and 347) and at least one parameter of a driving current associated with the at least one secondary pair of coils (325 and 327, 345 and 347) from the secondary pairs of coils (325 and 327, 345 and 347) to generate a secondary magnetic field (330, 350). The secondary magnetic field (330, 350) can interact with at least one magnetic field (320, 340) from the at least one magnetic field (320, 340) generated by the at least one primary pair of coils (315 and 317, 335 and 337) to improve either a magnetic field homogeneity of the at least one magnetic field (320, 340) and/or a magnetic gain of the at least one magnetic field (320, 340).

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An electromagnetic flowmeter comprising:
   a) a measuring section configured to permit a flow of the fluid through the electromagnetic flowmeter;
   b) a plurality of pairs of coils installed on a circumference of the measuring section, the plurality of pairs of coils comprising:
      i) at least one primary pair of coils for generating at least one magnetic field within the measuring section to measure a volumetric flow of fluid; and
      ii) at least one secondary pair of coils which are independently excitable in relation to the at least one primary pair of coils, the at least one secondary pair of coils remaining unexcited during normal operation of the electromagnetic flowmeter; and
   c) a transmitter which provides at least one driving current for exciting the plurality of pairs of coils, the transmitter being configured to excite the at least secondary pair of coils upon detection of a predefined event associated with a measurement parameter of the electromagnetic flowmeter;
      wherein the measurement parameter indicates a measurement effectiveness of the electromagnetic flowmeter and is associated with one of (i) flow profile, (ii) strength of magnetic field within a measuring section of the electromagnetic flowmeter and (iii) a condition of a process equipment.

2. The electromagnetic flowmeter as claimed in claim 1, wherein the at least one secondary pair of coils measures the at least one magnetic field generated by the at least one primary pair of coils.

3. The electromagnetic flowmeter as claimed in claim 1, wherein the at least one secondary pair of coils, upon excitation, generates at least one secondary magnetic field; and
   wherein the at least one secondary magnetic field interacts with at least one magnetic field from the at least one magnetic field generated by the at least one primary pair of coils to improve at least one of (i) a magnetic field homogeneity of the at least one magnetic field and (ii) a magnetic gain of the at least one magnetic field.

4. The electromagnetic flowmeter as claimed in claim 1, wherein the predefined event is when a magnitude of the measured voltage during a positive phase fails to match a magnitude of the measured voltage during a negative phase.

5. The electromagnetic flowmeter as claimed in claim 1, wherein the electromagnetic flowmeter is installed on a fluid carrying channel for measuring the volumetric flow of a fluid flowing within the fluid carrying channel; and wherein the fluid carrying channel is connected to at least one of an input and output valves of the process equipment.

6. The electromagnetic flowmeter as claimed in claim 1, wherein a diameter of the measuring section is within a range of 1200 millimeters to 3200 millimeters.

7. The electromagnetic flowmeter as claimed in claim 1, wherein the magnetic field strength at a center of the measuring section is between 0.01 milli Tesla and 10 milli Tesla.

8. The electromagnetic flowmeter as claimed in claim 1, wherein the at least one primary pair of coils and the at least one secondary pair of coils are installed along a first plane of the measuring section, the first plane being perpendicular to the flow of the fluid in the measuring section.

9. A method of operating an electromagnetic flowmeter for measuring a volumetric flow of a fluid, the method comprising:
   a) detecting an occurrence of a predefined event associated with one of (i) process equipment, (ii) at least one magnetic field generated by at least one primary pair of coils and (iii) a predefined frequency set during one of calibration of the electromagnetic flowmeter and installation of the electromagnetic flowmeter; and
   b) selecting at least one secondary pair of coils from the at least one group of secondary pairs of coils and at least one parameter of a driving current associated with the selected at least one secondary pair of coils from the at least one group of secondary pairs of coils to generate a secondary magnetic field;
      wherein the secondary magnetic field interacts with at least one magnetic field from the at least one magnetic field generated by the at least one primary pair of coils to improve at least one of (i) a magnetic field homogeneity of the at least one magnetic field and (ii) a magnetic gain of the at least one magnetic field;
      wherein the electromagnetic flowmeter comprises:
      a) a measuring section configured to permit a flow of the fluid through the electromagnetic flowmeter;
      b) a plurality of pairs of coils installed on a circumference of the measuring section, the plurality of pairs of coils comprising:
         i) the at least one primary pair of coils for generating the at least one magnetic field within the measuring section to measure the volumetric flow of the fluid; and
         ii) at least one group of secondary pairs of coils which are independently excitable in relation to the at least one primary pair of coils, the group of at least one secondary pairs of coils remaining unexcited during normal operation of the electromagnetic flowmeter; and c) a transmitter which provides at least one driving current for exciting the plurality of pairs of coils, the transmitter being configured to excite the selected at least secondary pair of coils upon detection of a predefined event associated with a measurement parameter of the electromagnetic flowmeter; and wherein the measurement parameter indicates a measurement effectiveness of the electromagnetic flowmeter and is associated with one of (i) flow profile, (ii) strength of the at least one magnetic field within a measuring section of the electromagnetic flowmeter and (iii) a condition of a process equipment.

* * * * *